United States Patent
Hu

(10) Patent No.: US 8,463,529 B2
(45) Date of Patent: *Jun. 11, 2013

(54) SYSTEM AND METHOD OF OPERATING INTERNAL COMBUSTION ENGINES AT FUEL RICH LOW-TEMPERATURE-COMBUSTION MODE AS AN ON-BOARD REFORMER FOR SOLID OXIDE FUEL CELL-POWERED VEHICLES

(75) Inventor: Haoran Hu, Novi, MI (US)

(73) Assignee: Eaton Corporation, Cleveland, OH (US)

(*) Notice: Subject to any disclaimer, the term of this patent is extended or adjusted under 35 U.S.C. 154(b) by 895 days.

This patent is subject to a terminal disclaimer.

(21) Appl. No.: 12/478,900

(22) Filed: Jun. 5, 2009

(65) Prior Publication Data

US 2009/0282812 A1 Nov. 19, 2009

Related U.S. Application Data

(63) Continuation-in-part of application No. 10/943,477, filed on Sep. 17, 2004, now Pat. No. 7,648,785, and a continuation-in-part of application No. 10/944,024, filed on Sep. 17, 2004, now Pat. No. 7,818,959.

(60) Provisional application No. 61/133,555, filed on Jun. 30, 2008.

(51) Int. Cl.
*F01N 3/00* (2006.01)
*F02D 41/00* (2006.01)

(52) U.S. Cl.
USPC .................... 701/104; 60/274; 60/285

(58) Field of Classification Search
USPC ........... 701/104, 103, 105, 109, 102; 60/274, 60/277, 278, 288, 289, 275, 285, 287; 429/12, 429/17, 19, 30
See application file for complete search history.

(56) References Cited

U.S. PATENT DOCUMENTS 3,948,223 A 4/1976 Benson
4,098,960 A 7/1978 Gagnon
(Continued)

FOREIGN PATENT DOCUMENTS

JP 2009270549 A * 11/2009

OTHER PUBLICATIONS

Sasaki et al., *Mechanism of the Smokeless Rich Diesel Combustion by Reducing Temperature*, SAE 2001-01-0655 (2001).
(Continued)

*Primary Examiner* — Hieu T Vo
(74) *Attorney, Agent, or Firm* — Paul V. Keller, PLC

(57) ABSTRACT

A distinctive method of operating an internal combustion engine in a low-temperature combustion mode. An engine combustion chamber is provided with fuel and air charges before combustion conditions are reached. The fuel charge is sufficient to provide a fuel-air equivalence ratio of at least 1.05. The fuel and air are allowed to mix prior to combustion. The fuel is provided to the combustion chamber at least 20 crank angle degrees before top dead center. The fuel and air charges are regulated such that the mixture auto-ignites as a result of the heat and pressure generated by the compression stroke. The amounts are further regulated such that combustion occurs below a temperature at which significant soot production occurs. In one embodiment, early intake valve closing is used to limit the air charge. The method provides a rich low temperature combustion mode operation, which has several applications.

20 Claims, 6 Drawing Sheets

U.S. PATENT DOCUMENTS

| | | | |
|---|---|---|---|
| 4,108,114 A | 8/1978 | Kosaka et al. | |
| 5,185,311 A | 2/1993 | Tabata et al. | |
| 5,339,634 A | 8/1994 | Gale et al. | |
| 5,678,647 A | 10/1997 | Wolfe et al. | |
| 5,732,554 A * | 3/1998 | Sasaki et al. | 60/278 |
| 5,858,568 A | 1/1999 | Hsu et al. | |
| 5,890,360 A | 4/1999 | Sasaki et al. | |
| 5,950,752 A | 9/1999 | Lyons | |
| 6,051,123 A | 4/2000 | Joshi et al. | |
| 6,109,025 A * | 8/2000 | Murata et al. | 60/297 |
| 6,124,054 A | 9/2000 | Gorman et al. | |
| 6,131,388 A | 10/2000 | Sasaki et al. | |
| 6,213,234 B1 | 4/2001 | Rosen et al. | |
| 6,230,494 B1 | 5/2001 | Botti et al. | |
| 6,276,473 B1 | 8/2001 | Zur Megede | |
| 6,365,290 B1 | 4/2002 | Ghezel-Ayagh et al. | |
| 6,502,533 B1 | 1/2003 | Meacham | |
| 6,520,142 B2 * | 2/2003 | Nogi et al. | 123/299 |
| 6,558,831 B1 | 5/2003 | Doshi et al. | |
| 6,609,582 B1 | 8/2003 | Botti et al. | |
| 6,634,345 B2 * | 10/2003 | Yoshizaki et al. | 123/568.12 |
| 6,655,130 B1 | 12/2003 | Kirwan et al. | |
| 6,655,325 B1 | 12/2003 | Botti et al. | |
| 6,763,799 B2 | 7/2004 | Ito et al. | |
| 6,874,314 B2 | 4/2005 | Tachtler et al. | |
| 6,932,063 B1 | 8/2005 | Hu | |
| 6,994,930 B1 | 2/2006 | Geisbrecht et al. | |
| 7,101,531 B2 | 9/2006 | Kamijo | |
| 7,213,397 B2 | 5/2007 | Hu et al. | |
| 7,246,485 B2 | 7/2007 | Ohki et al. | |
| 7,818,959 B2 * | 10/2010 | Hu et al. | 60/274 |
| 2002/0053336 A1 | 5/2002 | Nogi et al. | |
| 2002/0148221 A1 | 10/2002 | Jagtoyen et al. | |
| 2003/0066286 A1 | 4/2003 | Murata et al. | |
| 2003/0141122 A1 | 7/2003 | Boll et al. | |
| 2004/0055586 A1 | 3/2004 | Botti et al. | |
| 2004/0062968 A1 | 4/2004 | Tanner | |
| 2004/0177607 A1 | 9/2004 | Suzuki et al. | |
| 2005/0022450 A1 | 2/2005 | Tan et al. | |
| 2006/0063046 A1 | 3/2006 | Hu et al. | |
| 2007/0186537 A1 | 8/2007 | Elwart et al. | |
| 2008/0245342 A1 | 10/2008 | Werner | |

OTHER PUBLICATIONS

ISA Report and Opinion for related application PCT/IB2009/006128, May 11, 2009.

* cited by examiner

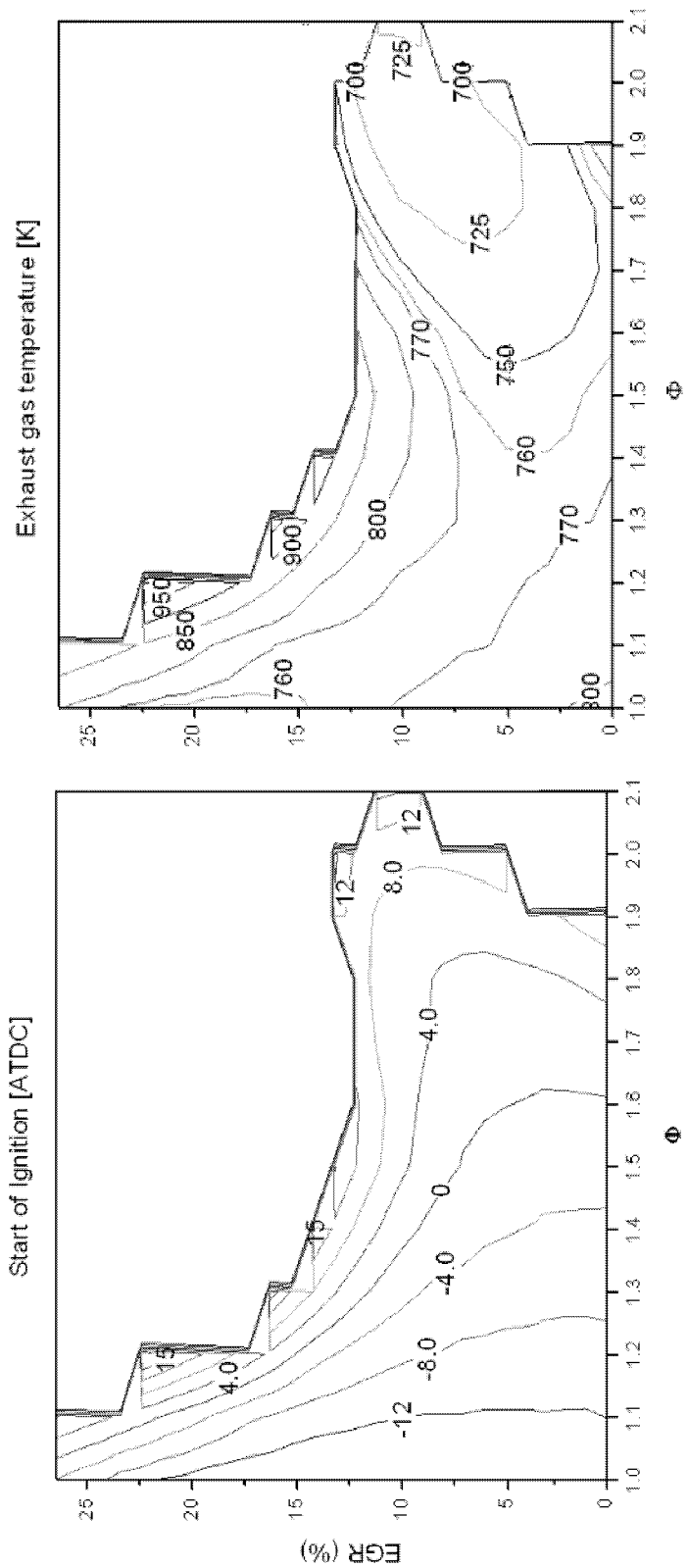

SYSTEM AND METHOD OF OPERATING INTERNAL COMBUSTION ENGINES AT FUEL RICH LOW-TEMPERATURE-COMBUSTION MODE AS AN ON-BOARD REFORMER FOR SOLID OXIDE FUEL CELL-POWERED VEHICLES

PRIORITY

This application is a continuation-in-part of U.S. Provisional Application No. 61/133,555 filed Jun. 30, 2008, U.S. patent application Ser. No. 10/943,477 filed Sep. 17, 2004, now U.S. Pat. No. 7,648,785 B2, issued on 19 Jan. 2010, and of U.S. patent application Ser. No. 10/944,024 filed Sep. 17, 2004, now U.S. Pat. No. 7,818,959 B2 issued on 26 Oct. 2010.

FIELD OF THE INVENTION

The present invention relates to a system and method of operating a diesel engine and particularly to the application of that system and method to solid oxide fuel cell-powered vehicles.

BACKGROUND

Modern diesel internal combustion engines operate by compression ignition with direct fuel injection. These engines normally have very low unburned hydrocarbons (HC) and carbon monoxide (CO) emissions. Nitrogen oxide ($NO_X$) and particulate matter (PM) emissions, on the other hand, have remained a challenge to diesel engine combustion and control engineers. The challenge in dealing with $NO_X$ and PM emissions is that efforts to reduce $NO_X$ generally increase PM emissions, and vice-versa. The relationship between these two exhaust components has been extensively studied and is known in the diesel engine design and manufacturing industry as the $NO_X$/PM tradeoff.

Regardless of the wide acceptance of the trade-off between $NO_X$ and PM emissions, it has been known at least since the 1990s that there is an exotic mode of engine operation referred to as low temperature combustion mode by which a diesel engine can be operated with little or no appreciable emission of either $NO_X$ or particulate matter.

Low-temperature combustion mode exists beyond the smoke limit. Beginning from a conventional operating mode, increasing the rate of exhaust gas recirculation (EGR) causes a reduction in $NO_X$ emissions and an increase in particulate matter emissions according to the usual relationship. As the EGR rate is further increased a point is reached at which the engine emits an excessive amount of smoke. This, the smoke limit, was long considered to be a practical limit on the operating range of a diesel engine. However, as described in U.S. Pat. No. 5,890,360 to Sasaki et al., it has been shown that if the exhaust gas recirculation rate is still further increased smoke is no longer produced. A point is reached at which the engine emits no smoke and both $NO_X$ and PM emissions are very low. Operation in this regime beyond the smoke limit is what is meant by low temperature combustion (LTC) mode operation.

The term low-temperature combustion mode reflects the realization that the low $NO_X$ and PM emissions are a consequence of the low temperatures at which combustion is occurring. A high degree of exhaust gas recirculation provides a high proportion of inert (with respect to combustion) gases like $N_2$, $CO_2$, and $H_2O$ in the combustion chamber. The high proportion of inert gases limits the peak gas temperatures that occur over the course of the combustion process. Low-temperature combustion mode limits peak temperatures to approximately 1800 Kelvin or less, whereas in conventional diesel engine combustion peak temperatures typically are several hundred degrees higher.

It is well known that lower combustion temperatures reduce $NO_X$ production, but the reduction in soot formation realized by low temperature combustion mode is more difficult to understand. Soot formation is a complex chemical process involving numerous steps and a large number of chemical reactions. The initial reactions involve the breakdown of the diesel fuel into smaller molecules. In subsequent reactions, the smaller molecules recombine and eventually form very large molecules that make up soot. The explanation for low soot production in low temperature combustion mode is that soot formation process does not proceed beyond the formation of smaller molecules, which are thought of as soot precursors.

While low-temperature combustion mode is laudatory in providing simultaneously low $NO_X$ and PM emissions, LTC has severe limitations including low engine efficiency and high emissions of unburned hydrocarbons (HC) and CO. See SAE 2001-01-0655, FIG. 4 (showing brake specific fuel consumption and HC and CO emissions increase rapidly as the engine operation moves into the "smokeless" rich regime) and page 3, last three sentences (stating brake-specific fuel consumption (BSFC) increased to a "serious" extent as the engine entered the fuel rich regime); U.S. Pat. No. 5,890,360, FIG. 2 (showing torque falls as EGR rate increases), FIG. 10 (showing a step increase in torque for a given fuel amount as the engine transitions from LTC mode (region I) to conventional mode (region II)) and col. 11 line 64 to col. 12 line 4 (stating conventional mode is more efficient than LTC mode and requires less fuel).

Low fuel efficiency is reflected by unburned hydrocarbons and CO (unused fuel) in the exhaust and by increased exhaust temperature upon transition to LTC mode (indicating fuel has been used to produce heat energy instead of mechanical energy). See SAE 2001-01-0655, page 4, first column and Appendix A (LTC increases exhaust gas temperature into the 200-250° C. range), page 4; U.S. Pat. No. 7,246,485 to Ohki et al., col. 8 (switching to lean LTC mode provides hydrocarbons that burn in exhaust aftertreatment devices, heating those devices).

Aside from poor fuel efficiency, LTC has a narrow operating envelope. See SAE 2001-01-0655, page 4, col. 1 (explaining that the large amount of EGR limited the operable range to idle and low load); U.S. Pat. No. 5,890,360 col. 9, lines 24-28 (stating LTC is only possible at low load), FIG. 7 (showing the region I in which LTC can be performed and the region II in which conventional combustion is used), and col. 2, lines 38-44 (stating that LTC combustion does not always occur and that it is necessary to determine when to perform LTC); U.S. Pat. No. 6,763,799 to Ito et al. col. 1, lines 36-45 (stating that normal combustion is required to provide drivability except at idle and low load). It is difficult to stably maintain low temperature combustion. See U.S. Pat. No. 6,763,799 col. 1, lines 51-62.

Because of the various disadvantages described above, LTC has been suggested as an option only for special circumstances such as low power and idle operation. See U.S. Pat. No. 5,890,360. When little or no power is required, low fuel efficiency is not a great issue. Also, the low-power regime permits the high degree of EGR required to achieve LTC in the prior art.

U.S. Pat. No. 6,131,388 to Sasaki et al. and U.S. Pat. No. 7,246,485 propose LTC mode to heat exhaust aftertreatment devices at low load and idle conditions by taking advantage of the increase in exhaust temperature and by combustion of the residual hydrocarbons in the exhaust. While diesel exhaust temperatures can reach 500° C., at idle they drop into the 100-150° C. range. LTC raises the exhaust temperatures into the 150-250° C. range. The unburned hydrocarbons and CO provided by LTC operation can be combusted in exhaust aftertreatment devices having oxidation catalysts to further increase temperatures.

In LTC mode, rich engine operation is also possible. U.S. Pat. No. 6,131,388 describes rich engine operation as part of a process for heating exhaust aftertreatment devices. This process involves brief periods of rich LTC engine operation. The hydrocarbons produced by the engine during these rich periods are stored temporarily in an exhaust aftertreatment device having a hydrocarbon storage ability. Following a brief period of rich operation, the engine is operated lean. Oxygen made available by lean engine operation allows combustion of the stored hydrocarbons producing large amounts of heat within the exhaust line. By alternating between rich LTC operation and conventional lean engine operation, exhaust aftertreatment devices can be maintained in the 350-550° C. range. See U.S. Pat. No. 6,131,388.

SUMMARY

The present invention provides a distinctive method of operating an internal combustion engine in a low-temperature combustion mode. The invention includes engines and power generation systems that operate according to the distinctive method. According to the method, a combustion chamber of the engine is operated in a cycle comprising an intake stroke, a compression stroke, a power stroke, and an exhaust stroke. The combustion chamber is provided with an air charge during the intake stroke. The combustion chamber is also provided with a fuel charge before combustion begins. The fuel charge is sufficient to make the fuel-air ratio within the combustion chamber rich with an equivalence ratio of at least 1.05. The fuel and air are allowed to mix prior to combustion. The fuel is provided to the combustion chamber at least 20 crank angle degrees before top dead center. The fuel and air charges are regulated such that the mixture auto-ignites as a result of the heat and pressure generated by the compression stroke. The amounts are further regulated such that combustion occurs below a temperature at which significant soot production occurs. The method provides a rich low temperature combustion mode operation, which has several applications.

An engine operating by the method produces an exhaust with a relatively high temperature, little or no oxygen, and high chemical energy. The exhaust is very low in $NO_X$ and particulate matter. The excess fuel present during the combustion process is reformed during the process, placing the chemical energy in an easily utilized form.

The method of the invention allows low-temperature rich combustion using less EGR than prior art low-temperature combustion mode methods. The method also allows the production of a rich low-temperature combustion mode exhaust that has a higher temperature than could be achieved using the prior art methods. The exhaust temperature is usually 250° C. or higher, potentially much higher.

In one embodiment, in order to obtain a suitable fuel and air charge to effectuate the method, an intake valve is closed before the intake stroke completes. The early intake valve reduces the air charge to the combustion chamber and results in a sub-atmospheric pressure within the combustion chamber at the end of the intake stroke. The smaller air charge leads to less heat and pressure being generated by the compression stroke.

In another embodiment, in order to increase the exhaust temperature, an exhaust valve is opened before the power stroke completes The early exhaust valve opening causes a reduction in mechanical energy generation in favor of imparting greater heat energy to the exhaust.

Another aspect of the invention is a power generation system comprising an internal combustion engine that operates according to the foregoing method and a solid oxide fuel cell. The engine exhaust is supplied to the fuel side of the fuel cell, optionally after passing the exhaust through a fuel reformer. The engine provides fuel for the fuel cell and maintains or helps maintain the fuel cell at an operating temperature. The thermal energy in the exhaust can also be utilized to maintain the fuel reformer temperature and reform fuel. In one embodiment, supplemental fuel to be reformed is supplied by the engine to the exhaust either late in the combustion process or during the exhaust stroke. In another embodiment, supplemental fuel is injected into the exhaust line downstream from the engine.

In a preferred embodiment of the power generation system comprising the internal combustion engine and the fuel cell, the engine operation is maintained in a narrow torque-speed range. Torque is provided by the engine and also by an electric motor powered by electricity produced by the fuel cell. When torque requirements increase, additional torque is provided electrically so that the operating point of the engine need not be altered. Optionally, to sustain the increased electrical power output, a rate at which supplemental fuel is provided to the exhaust can be increased. Likewise, when torque requirements decrease, electrical power usage is reduced while the engine's operating point is allowed to remain relatively unchanged. If the mechanical power output of the engine exceeds current requirements, the surplus can be converted to electrical energy by using the electric motor as a generator. Excess electrical power can be stored in a power storage system. If the total of the mechanical power provided by the engine and the electrical power provided by fuel cell converting the chemical energy in the engine exhaust to electrical power produces an excess of energy exceeding the storage capacity of the power storage system, the engine is preferably shut down entirely rather than operated at other than a preferred torque-speed point. This method provides a stably operating, responsive, and highly efficient power generation system with an exceptionally clean exhaust.

Another aspect of the invention is a power generation system comprising an engine and an exhaust aftertreatment system. Normally, the engine operates lean and the exhaust aftertreatment system removes $NO_X$ from the exhaust using an $NO_X$ absorber-catalyst. For regenerating the $NO_X$ absorber-catalyst, the engine can be operated in the rich low temperature combustion mode. This is especially useful for desulfating the $NO_X$ absorber-catalyst under low load or idle conditions. The rich low-temperature combustion mode operation, optionally in cooperation with an exhaust line fuel reformer, is suitable for continuously maintaining the $NO_X$ absorber-catalyst under the rich high temperature conditions required for desulfation.

The primary purpose of this summary has been to present certain of the inventors concepts in a simplified form to facilitate understanding of the more detailed description that follows. This summary is not a comprehensive description of every one of the inventors concepts or every combination of the inventors concepts that can be considered "invention". Other concepts of the inventor will be conveyed to one of ordinary skill in the art by the following detailed description together with the drawings. The specifics disclosed herein may be generalized, narrowed, and combined in various ways with the ultimate statement of what the inventor claim as his invention being reserved for the claims that follow.

BRIEF DESCRIPTION OF THE DRAWINGS

FIG. 3 is an operating map of an engine showing the effect of fuel-air ratio and EGR rate on auto-ignition timing.

FIG. 4 is an operating map of an engine showing the effect of fuel-air ratio and EGR rate on exhaust temperature within the rich regime.

DETAILED DESCRIPTION

Figure 1:
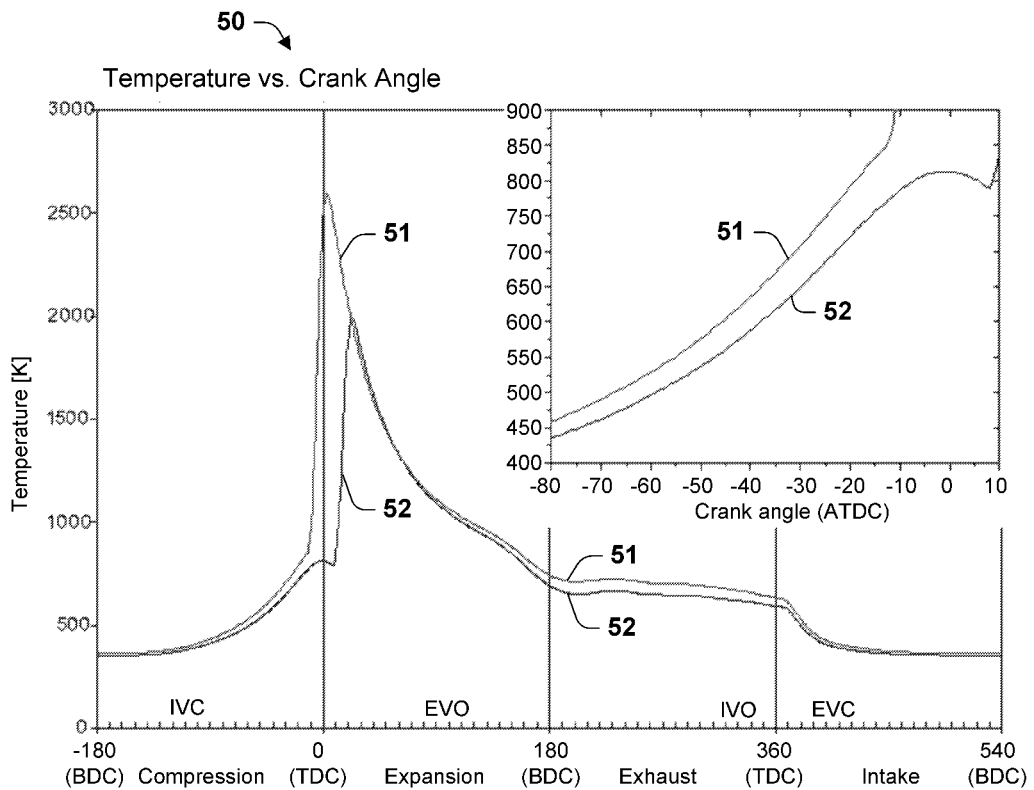
FIG. 1 is a plot of combustion gas temperatures showing that within the rich regime of pre-mixed fuel-air ratios, increasing the amount of pre-injected fuel can reduce combustion temperatures sufficiently to bring about a low temperature combustion mode.

FIG. 1 is a plot 50 illustrating how increasing the premixed fuel amount in the rich regime can bring about low temperature combustion with just 10% EGR. The data for the plot 50 was generated by a computer simulation assuming n-heptane as the fuel and a compression ratio of 16. In the comparison case 51, the pre-mixed fuel provides a fuel-air ratio of 1.0 and the gas temperature reaches 2500 K over the course of combustion. This temperature is too high and the comparison case fails to achieve low-temperature combustion mode. In the example case 52, the fuel-air ratio is 1.8. The gas temperature peaks below 2000 K, indicating the combustion temperatures have dropped to a degree commensurate with what would be sufficient to bring about low temperature combustion mode.

Figure 2:
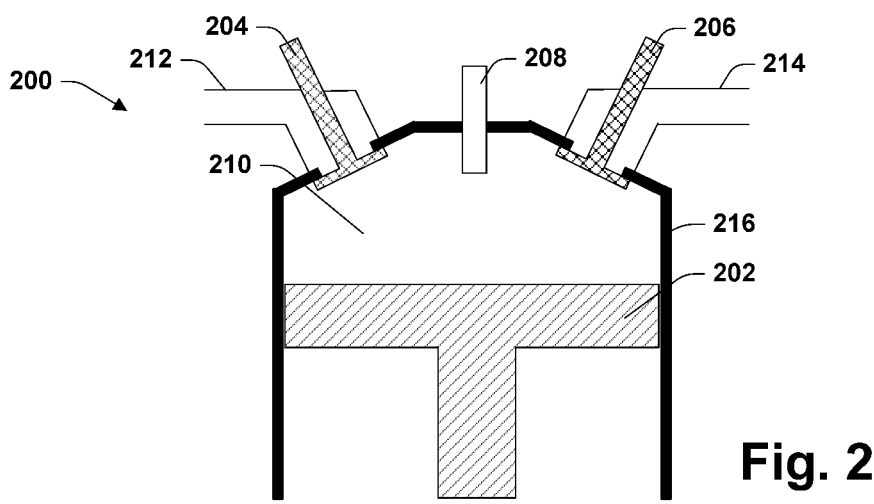
FIG. 2 is a schematic illustration of a diesel engine cylinder.

FIG. 2 provides a schematic illustration of a combustion chamber 200 of a diesel engine 300 that can be configured for low temperature combustion mode according to the present invention. The combustion chamber 200 is provided with a piston 202, an intake valve 204, an exhaust valve 206, and a fuel injector 208. The diesel engine 300 operates the combustion chamber 200 through a series of strokes including at least an intake stroke, a compression stroke, a power stroke, and an exhaust stroke.

According to the invention, a rich fuel-air ratio is established prior to the beginning of combustion. For the engine 300, this can be accomplished by a pre-injection, which is an injection of fuel into the combustion chamber 200 made prior to when the crank angle reaches about 20 crank degrees of top dead center (TDC). The pre-injection can be made with the fuel injector 208. The fuel provided by the pre-injection is allowed time to premix with the air and any EGR gas within the volume 210 prior to combustion.

Whereas in the prior art low-temperature combustion mode was achieved by providing the engine cylinder with large amounts of inert gas, especially EGR gas, preferably cooled EGR gas, in the present invention low temperature combustion mode is achieved without requiring large amounts of inert gas by limiting combustion to compositions well within the rich regime of fuel-air ratios. When the pre-injection results in a rich fuel-air mixture throughout the volume 210 prior to combustion, combustion temperatures are reduced by endothermic reactions that reform the part of the fuel that is incompletely combusted due to the inadequate supply of oxygen. Heating and vaporizing of excess fuel provides an additional heat sink that reduces peak combustion temperatures. Rich conditions are established throughout the charge air prior to the start of combustion to forestall the development of low fuel-air ratio regions in which combustion temperatures would not be limited by these mechanisms.

In the preferred implementation of the present invention, combustion is initiated by compression. The pre-mixed fuel and air auto-ignite as a result of the heat and pressure that compression generates. Combustion is essentially homogeneous, with ignition typically occurring at several places throughout the volume 210. The entire pre-mixed fuel-air charge combusts at nearly the same time. By contrast, in conventional diesel engine operation combustion is stratified, which means that combustion occurs along a flame front where injected fuel meets already heated and pressurized air. The fuel-air ratios at the flame front are generally quite different from the fuel-air ratios of the volume 210 as a whole.

Plot 50 shows that increasing the fuel-air equivalence ratio from 1.0 to 1.8 delays the onset of combustion. If auto-ignition is delayed much more than shown in plot 50 for case 52, auto-ignition will not take place at all. The parameters used for FIG. 1 provide a narrow range of fuel-air ratios over which there will be auto-ignition while combustion is of the low temperature combustion mode variety. That range can be expanded by reducing the air charge, which will be described subsequently.

FIGS. 3 and 4 provide an engine operating map generated using the same model that produced FIG. 1. FIG. 3 shows that ignition delay increases with fuel-air ratio and that the maximum fuel-air ratio at which auto-ignition will occur depends on the EGR amount. The maximum fuel-air equivalence ratio at which auto-ignition will occur is about 2.0, and this is only possible when the EGR rate is limited to about 15% or less. FIG. 4 show the exhaust temperatures will be in the range from about 700 K to about 950 K.

Not all of the conditions at which auto-ignition will occur are low temperature combustion mode conditions. For the conditions of FIG. 1, the minimum fuel-air equivalence ratio for low temperature combustion mode is near 1.8. If the fuel-air ratio is too low, there will be insufficient endothermic reaction to maintain combustion temperatures below the level where soot formation takes place. If the fuel-air ratio is too high, the ignition delay is too great and auto-ignition will not occur.

It should be noted that low temperature combustion mode requires a progressively lower combustion temperature limit as fuel-air ratio increases. In other words, soot formation can occur at somewhat lower temperatures when higher fuel-air ratios are used. Lowering combustion pressures increases the temperature limit. The temperature limit is generally in the range from about 1700 K to about 2000 K depending on the foregoing factors as well as the type of fuel.

The minimum pre-mixed fuel-air equivalence ratio is 1.05 or greater. The exact range of fuel-air ratios over which auto-ignition occurs and combustion is in the low temperature combustion mode regime depends on the compression ratio for the volume 210 and other factors that affect the temperature to which the cylinder gases will be raised by compression. The range also depends on the temperature of the intake gases, the amount of air charged to the combustion chamber 200, and exhaust gas fraction in the cylinder charge.

A fuel-air equivalence ratio of 1.0 is achieved when the ratio between fuel and oxygen in the volume 210 is stoichiometric for combustion. A stoichiometric amount of hydrocarbon fuel is the amount that would consume all of the available oxygen while being entirely converted to complete combustion products, which are $H_2O$ and $CO_2$. Increasing the fuel injection amount to provide double a stoichiometric amount of fuel would give a fuel-air equivalence ratio of 2.0.

The minimum fuel-air ratio required to achieve low temperature combustion can be reduced by decreasing the extent to which the cylinder gases are heated by compression. Designing an engine to provide a comparatively lower compression ratio will reduce the temperature to which the cylinder gases are elevated by the compression stroke. Lowering the temperature and pressure increases ignition delay. Increasing the fuel-air ratio also increases the ignition delay (within the rich regime). Accordingly, lowering the temperature and pressure at TDC both reduces the minimum fuel-air ratio (by facilitating LTC) and reduces the maximum fuel-air ratio (by inhibiting auto-ignition).

In one embodiment of the present invention, the temperature and pressure to which the cylinder gases are elevated by the compression stroke is reduced through early intake valve closing. Early intake valve closing generally comprises closing the intake valve 204 when the combustion chamber volume 210 is at less than 90% of its maximum volume and preferably when the volume 210 is at about 84% of its maximum. In terms of cylinder pressure, the early intake valve closing causes the pressure within the combustion chamber volume 210 to drop to sub-atmospheric as the piston 202 approaches bottom dead center (BDC). The pressure drops to below 0.9 bar. Preferably, the pressure drops to about 0.8 bar.

Early intake valve closing reduces the amount of gas that will be drawn into the volume 210 during the intake stroke. The same effect might be achieved in other ways, such as throttling the air intake. An advantage of early intake valve closing is that it is easy to implement and accurately control on an engine having a variable valve actuation mechanism. Early intake valve closing may be particularly useful when implementing the present invention using a diesel engine designed without regard for the present invention or designed to be suitable for different modes of operation that militate in favor of a high compression ratio.

Early intake valve closing makes an engine behave somewhat as if it has a lower compression ratio. It reduces the ratio between the volume of the intake gases under ambient conditions and their volume at the end of the compression stroke. In addition, to reducing the temperature and pressure realized by the compression stroke, early intake valve closing reduces the oxygen concentration within the combustion chamber 200 during combustion. Of course, the intake valve 204 should not be close too early. If the temperature and pressure increases created by compression are insufficient, auto-ignition ignition will not take place regardless of the pre-mixed fuel-air ratio.

Figure 5:
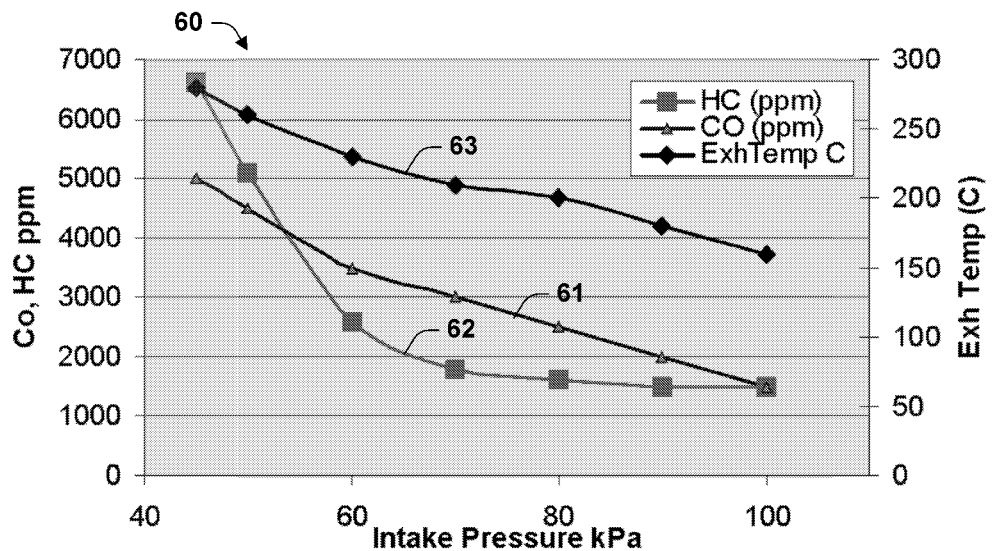
FIG. 5 is a plot showing the effect of reducing intake charge on the extent of combustion.

Reducing the amount of gas taken in by the combustion chamber 200 has the effect of reducing reaction rates during combustion. Plot 60 of FIG. 5 illustrates this phenomenon using an example from lean combustion. Plot 60 shows that reducing the intake gas pressure increases the presence of incomplete combustion products in the exhaust gas. The incomplete combustion products are represented by the CO concentration curve 61 and HC concentration curve 62. In addition, the lower intake pressure reduces the thermal efficiency of the engine 300 as illustrated by the exhaust temperature curve 63. In conventional engine applications, the increase in incomplete combustion products and the reduced thermal efficiency of the engine would be disadvantages, but in the applications and embodiments of the present invention described below, these are desirable results.

Figure 6:
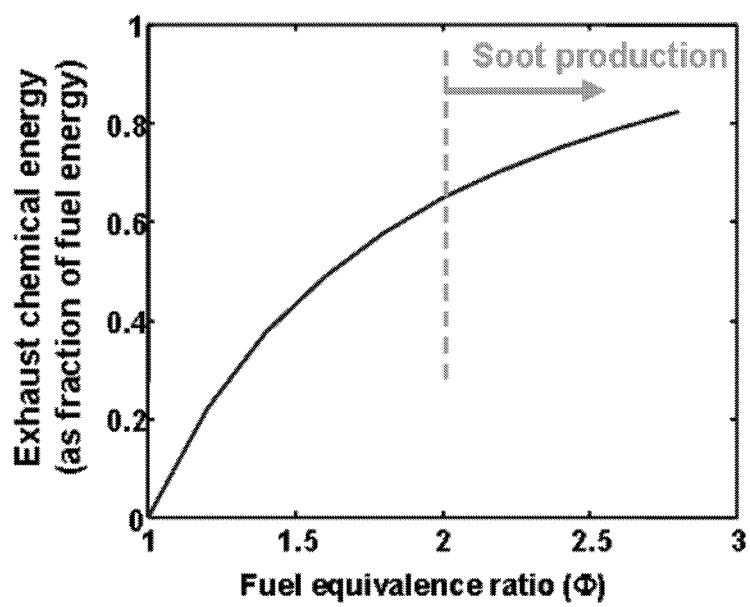
FIG. 6 shows how increasing the fuel-air ratio increases the chemical energy content of the exhaust.
Figure 7:
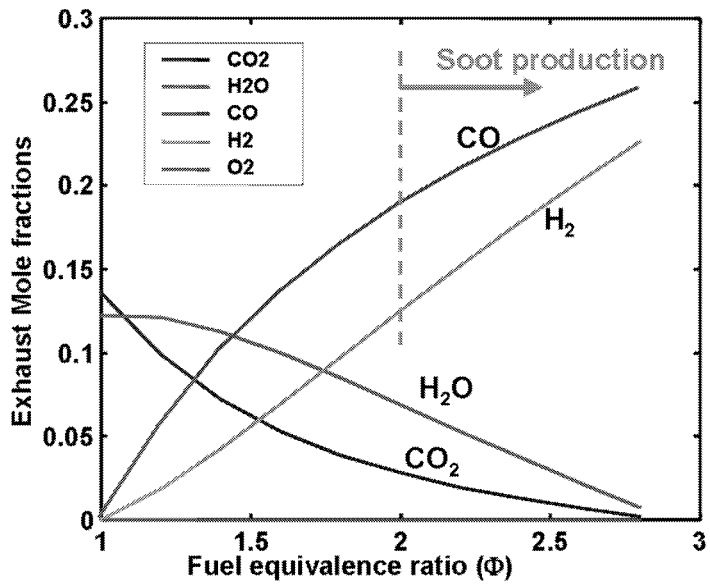
FIG. 7 shows how increasing the fuel-air ratio affects the chemical composition of the exhaust.

The pre-injection provides the volume 210 with a fuel-air equivalence ratio of 1.05 or greater. FIG. 6 illustrate how increasing the fuel-air ratio increases the chemical energy content of the exhaust. FIG. 7 illustrates that the excess fuel becomes substantially reformed by combustion within the engine 300 providing a high proportion of $H_2$ and CO. After reforming, the chemical energy in the fuel is more readily available.

As explained previously, auto-ignition will not occur if the pre-injection makes the fuel-air ratio too high, however, once combustion has begun the increased temperature allows the fuel-air ratio to be further increased. Accordingly, the invention provides the option of increasing the fuel-air ratio by injecting additional fuel into the volume 210 as combustion is taking place. The additional fuel injected into the combustion chamber 200 will be effectively reformed.

The pre-mixed fuel-air ratio must be limited to avoid soot formation as well as to avoid excessive ignition delay. FIGS. 6 and 7 indicate that for the exemplary conditions soot production will occur if the fuel-air equivalence ratio is made higher than about 2.0. The soot formation limit is highly approximate: fuel air equivalence ratios of the 3.0 may be practical. If a higher chemical energy content is desired than can be provided using pre-mixed fuel, the content may be increased by fuel injection during combustion as described above or still later in the expansion stroke after the cylinder gases have cooled below combustion temperatures. As the cylinder temperatures decrease, a higher fuel content can be tolerated without soot formation.

For a conventional diesel engine converted to operate according to the present invention, the preferred early intake valve closing provides a range of rich fuel-air ratios at which auto-ignition and low temperature rich combustion according to the present invention can be achieved while using little or no EGR. Using the guidelines provided herein, the invention can be practiced on a wide range of engines with ordinary diesel fuels, although some experiments may be required to find suitable adjustments for a particular engine-fuel system. Typical parameters to vary in such experiments are the pre-mixed fuel-air ratio and the timing of early intake valve closing.

Figure 8:
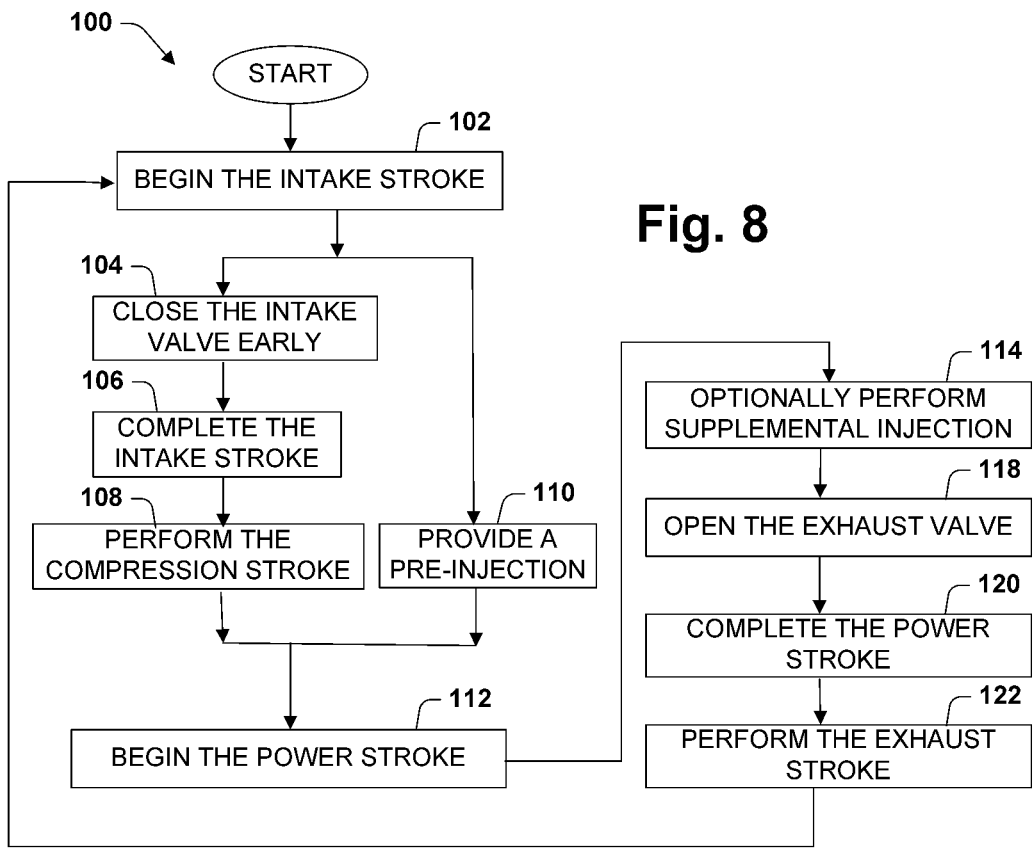
FIG. 8 is a flow chart of a method of the invention.

FIG. 8 provides a flow chart of an exemplary method 100 of operating a diesel engine 300 in a low temperature rich combustion mode as conceived by the inventor. The first step 102 of the method 100 is to initiate an intake stroke for the combustion chamber 200. The intake stroke comprises drawing the piston 202 to expand the volume 210 within the combustion chamber 200. The intake valve 204 is opened for the intake stroke. Air, optionally mixed with exhaust gas, is drawn through the intake channel 212 into the combustion chamber volume 210 by the intake stroke.

The exhaust valve 206 is generally kept closed throughout the intake stroke. Opening the exhaust valve 206 during part of the intake stroke would draw exhaust from an exhaust manifold into the combustion chamber 200 and is a method of achieving exhaust gas recirculation. The exhaust within the exhaust manifold is at a high temperature making low temperature combustion difficult to achieve by conventional methods when this type of EGR is used. With low rates of EGR, low temperature combustion is still be possible in spite of high EGR gas temperatures. High temperature EGR gas can be useful for vaporizing pre-injected fuel and generating a uniform fuel-air mixture.

The next step 106 is closing the intake valve 204 early. In a conventional diesel cycle, the intake valve 204 remains open until the piston 202 reaches its apogee (bottom dead center) where the volume 210 is at a maximum. Early closing means that the intake valve 204 closes while the intake stroke is still in progress and the volume 210 is still expanding.

Early intake valve closing is counterintuitive for achieving low temperature combustion. Early intake valve closing reduces the amount of inert gas that will be drawn into the volume 210. Generally, increasing the amount of inert gas within the volume 210 is considered key to achieving low-temperature combustion. Inert gas not only dilutes oxygen but provides a heat sink during combustion. As it turns out however, the benefits described above including reduced oxygen concentration and reduced adiabatic temperature rise, together with the pre-injection, allow low-temperature combustion to be achieved with the reduced amount of inert gas.

After the early intake valve closing 106, the method 100 proceeds with completing the intake stroke 106 and performing the compression stroke 108. The compression stroke 108 comprises pushing the piston 202 into the cylinder 216 to reduce the volume 210. Both the intake valve 204 and the exhaust valve 206 are closed during the compression stroke 108. Gas trapped within the volume 210 is compressed by the compression stroke 108. The pressure within the volume 210 increases and the temperature of the trapped gas rises.

The method 100 also comprises step 110, which provides a pre-injection of fuel into the combustion chamber 200. Preferably, this injection is made directly into the volume 210 using the fuel injector 208. Injected fuel mixes with air within the volume 210 prior to the beginning of combustion within the current diesel cycle of the combustion chamber 200. The pre-injection 110 may be performed during the compression stroke 108 any time when the piston 202 is at position corresponding to at least 20 crank angle degrees before TDC. The pre-injection 110 may also be performed during the intake stroke preceding the compression stroke 108. Performing the pre-injection 110 earlier improves mixing of the pre-injected fuel with the cylinder air.

Preferably the pre-injection is made early enough that the fuel becomes mixed with the intake air to provide an effectively homogenous mixture. Preferably the pre-injected fuel becomes vaporized within the combustion chamber 200 prior to ignition. During the pre-injection 110, the heat and oxygen concentration within the volume 210 are insufficient for compression ignition to occur. Effectively mixed, the pre-injected fuel will limit the combustion flame temperature by increasing the extent of endothermic reforming reactions in proportion to exothermic combustion as well as by providing additional thermal mass. As this is the ultimate goal, methods for forming an equivalent fuel-air mixture other than pre-injecting fuel into previously charged air are alternatives for practicing the present invention. Pre-injection is advantageous in that it requires only a simple modification to a conventional diesel.

The engine 300 operates by compression ignition and does not provide a spark to ignite combustion. In a typical diesel engine, combustion is initiated by injecting diesel fuel into the combustion chamber volume 210 at a time when air compressed within the volume 210 by the piston 202 has created a sufficiently high concentration of oxygen and a sufficient amount of heat. When the fuel encounters the hot oxygen-containing gas, combustion occurs heterogeneously in the region where injected fuel and air are mixing. That is stratified combustion.

In the present case, the volume 210 is provided with an excess of fuel before the gases in the volume 210 have reached the temperature and pressure required for auto-ignition. Combustion begins soon after the auto-ignition temperature and pressure are reached. The fuel-air mixture requires a certain amount of time at this elevated temperature and pressure for ignition to occur. This time is required for the preliminary chemical reactions of combustion to progress. After this period, the length of which is referred to as the ignition delay, there are adequate concentrations of reactive species to provide a high combustion rate. Ignition is marked by a rapid increase in temperature. If the temperature and pressure within the volume 210 drop too much due to expansion of the volume 210 before ignition has time to occur, ignition may fail even though the required temperature and pressure were briefly reached.

The temperature and pressure required for auto ignition are generated by compressing the volume 210. The travel of piston 202 and the initial temperature and composition of the fuel and air trapped within the combustion chamber 200 determine the ignition timing. In the present invention, fuel injection cannot be used to control the ignition timing because adding more fuel to the already rich fuel-air mixture provides only higher fuel-air ratios, which are less combustible than leaner fuel-air ratios within the rich regime.

The power stroke 112 begins at the end of the compression stroke 108. The crank angle is at TDC when the power stroke begins. The intake valve 204 and the exhaust valve 206 are closed at the beginning of the power stroke.

Optionally, supplemental fuel can be injected into the volume 210 during the power stroke 112 in step 114. Providing this fuel injection early in the power stroke can increase the extent to which the supplemental fuel is reformed, however, the supplemental fuel injection should not be made so early as to interfere with auto-ignition. As explained previously, the increase in fuel-air ratio that results from any supplemental fuel injection 114 does not promote ignition, but can interfere with ignition. Nevertheless, the supplemental fuel injection 114 can begin very early in the power stroke, possibly even a little before the power stroke begins. The injected fuel does not instantly mix throughout the volume 210. Auto-ignition can occur anywhere in the volume 210 and is expected to occur at multiple locations. The supplemental fuel injection 114 can begin as early as desired provided that it begins late enough that some portions of the volume 210 remain substantially unaffected by the supplemental fuel injection 114 for a sufficient period to allow auto-ignition to occur.

Because the fuel-air charge provided by the intake stroke and the pre-injection 110 is rich, the maximum temperature of combustion in any locality within the volume 210 is substantially limited by the initial charge composition. If a supplemental fuel injection 114 affects the peak temperature at any locality, the only effect will be to reduce the peak temperature by increasing the richness of the mixture at the time of combustion. Preferably, the peak temperature is in the range from 1600 Kelvin to 2000 Kelvin, and is most preferably about 1700 Kelvin. In the most typical circumstance, combustion of the initial charge will be essentially complete at the time that any supplemental fuel injection 114 is performed. Temperatures will already be dropping and the supplemental fuel will only serve to take up heat physically and by endothermic chemical reaction.

The peak temperature that will occur during combustion is approximately the adiabatic flame temperature for the initial fuel-air charge assuming conditions resulting after adiabatic compression to the point of TDC. The adiabatic flame temperature will be influenced by the fuel pre-injection amount, by the compression ratio of the combustion chamber 200, by the temperature, amount and composition of the gas drawn through the conduit 212 plus the composition and temperature of the exhaust gas remaining in the volume 210 after the exhaust stroke 122. A correction to the peak temperature estimate can be made to account for heat transfer between the cylinder gases and the cylinder wall.

Combustion temperatures are not easily measured. Furthermore, in typical engine operation, combustion will occur over a range of temperatures within the volume 210 within a single piston cycle. Accordingly, the rich low-temperature combustion mode of the present invention is not characterized quantitatively in terms of the combustion temperatures. Rather the rich low-temperature combustion mode of the present invention is most clearly indicated by a rich fuel-air composition being charged to the volume 210 and allowed to mix prior to combustion, by auto-ignition of that mixture via compression, and by the combustion process exhaust being very low in both $NO_X$ and soot. Estimating combustion temperatures will be helpful in determining the conditions that will achieve the rich LTC mode of the invention for any given engine/fuel combination, but some experimentation will likely be needed to determine the required settings for any given engine-fuel combination.

Whereas in the prior art, low temperature combustion required an EGR rate of at least 70% with un-cooled EGR and at least 55% with cooled EGR, the present invention achieves low temperature combustion with cooled or uncooled EGR rates of 25% or less, 10% or less, and even with no EGR. This means that engines that are not configured for EGR, for sufficiently high rates of EGR, or with EGR cooling can be adjusted to operate in low-temperature combustion mode according to the present invention.

Reduced reliance on EGR is important as an enabler for low temperature combustion with high exhaust temperature. If high rates of EGR are in use, measures that increase exhaust temperature will make low-temperature combustion mode difficult or impossible to achieve. In the prior art, reducing the EGR gas temperature by cooling reduced the amount of EGR required to achieve low-temperature combustion mode from 70% to 55%. With prior art methods, increasing the exhaust gas temperature would increase the required EGR rate, which would quickly reach a requirement that was impossible to satisfy. Reducing the EGR requirement reduces the impact of EGR gas temperature on combustion temperatures and makes measures that increase exhaust gas temperature compatible with low-temperature combustion mode operation.

Step 118 is opening the exhaust valve 206. Normally, this would not take place until approximately the completion of the power stroke at step 120. Nevertheless, in one embodiment the exhaust valve 206 is opened early, meaning significantly prior to completion of the power stroke. Opening the exhaust valve 206 early increases the exhaust temperature, which can be useful in the applications discussed below. FIG. 1 illustrates how the cylinder temperature decreases during the power (expansion) stroke. The exhaust temperature is lowest when the exhaust valve 206 is opened at approximately BDC. If the exhaust valve is opened earlier, then the exhaust temperature will increase approximately as cylinder temperatures are higher before BDC.

During the power stroke, the expanding gases within the volume 210 perform work on the piston 202. When the exhaust valve 206 is opened early, energy that would otherwise be used to perform work on the piston 202 is instead converted to thermal energy. The earlier the exhaust valve 206 is opened, the more potential work energy is converted into heat. Accordingly, the timing which was the exhaust valve 206 is opened can use to control the exhaust temperature within limits that are a function of the combustion process.

Whereas the prior art low temperature combustion mode provided exhaust temperatures in the range from 425 to 525 Kelvin, the present invention provides exhaust temperatures that are typically 700 Kelvin or higher. The higher exhaust temperatures provided by the present low temperature combustion mode are advantageous in the applications described below. The low temperature combustion mode can be maintained indefinitely while producing exhaust at the higher temperatures.

After completing the power stroke 120, the exhaust stroke 122 is performed. For the exhaust stroke, the exhaust valve 206 is open. The intake valve 204 is generally close during the exhaust stroke. Optionally, the intake valve 204 can be opened during a portion of the exhaust stroke 122 in order to provide exhaust gas to the conduit 212. This is another form of exhaust gas recirculation, which is known as internal EGR. Again, because the exhaust is generally at a very high temperature, this form of exhaust gas recirculation would not be used in the prior art if low-temperature combustion was desired.

As described in U.S. Pat. No. 6,932,063 to Hu, the conduit 212 can be provided with a volume within which to contain and cool internal EGR gas provided directly from the volume 210. The volume is sized to contain the desired amount of EGR gas and is configured for heat exchange with either engine coolant or external air. Internal EGR is particularly useful when the engine 300 is configured to switch to and from low temperature combustion mode operation. Internal EGR allows the EGR rate to be changed more rapidly than when conventional or external EGR is used exclusively. Rapid switching avoids undesirable operating conditions that occur between the conventional combustion mode regime and the low temperature combustion mode regime. While cooling EGR gases can facilitate achieving low temperature combustion mode, the effect is less in the present invention than in the prior art because the present invention requires a much smaller proportion of EGR gas. Cooling EGR gases will increase the ignition delay and will be undesirable in some circumstances.

At the conclusion of the exhaust stroke 122 the diesel cycle can be repeated beginning again with step 102. The diesel engine 300 normally comprises a plurality of combustion chambers 200. The method 100 may be cyclically repeated in one or more of those combustion chambers. In a preferred embodiment, the method 100 is carried out for all of a plurality of the combustion chambers 200 of the engine 300 whereby the exhaust composition and temperature provided by the combustion chamber 200 are representative of the entire exhaust from engine 300. Of course it is still possible to operate only a fraction of the cylinders of the engine 300 according to the method 100.

The invention is not limited to any particular manner of actuating the intake valve 204 and the exhaust valve 206. The timing with which these valves open and close can be controlled by a fixed mechanical relationship to the turning of a cam shaft. In a preferred embodiment, however, the intake valve 204 and exhaust valve 206 are controlled by a variable valve actuation mechanism. A variable valve actuation mechanism allows the combustion mode, the conditions of low-temperature combustion, and the exhaust temperature to be dynamically controlled.

The engine 300 can be constructed to operate according to the method 100. Alternatively, the method 100 can be implemented by suitably programming an engine control unit (ECU) of an engine 300 that has a variable valve actuation mechanism. The engine 300 has an ECU programmed for operating a combustion chamber 200 in a low-temperature combustion mode such as that of the exemplary method 100. The programming may operate the combustion chamber 200 always in the low-temperature combustion mode or only at such times as the low-temperature combustion mode is selected. In either case, the ECU comprises instructions for carrying out the steps of a low-temperature combustion mode method according to the present invention such as the exemplary method 100.

The engine 300 is preferably a compression ignition diesel engine, although it is possible to implement the invention using an engine originally designed for gasoline and spark ignition. In general, spark ignition engines are not as durable as diesel engines and will wear quickly under the stresses created by compression ignition operation. Nevertheless, an engine designed for spark ignition may be modified to operate according to the present invention. The fuel described as pre-injected fuel can be pre-mixed with air before being charged to the cylinders. The rich low temperature combustion mode of the present invention does not require direct injection of fuel into the engine cylinders.

Figure 9:
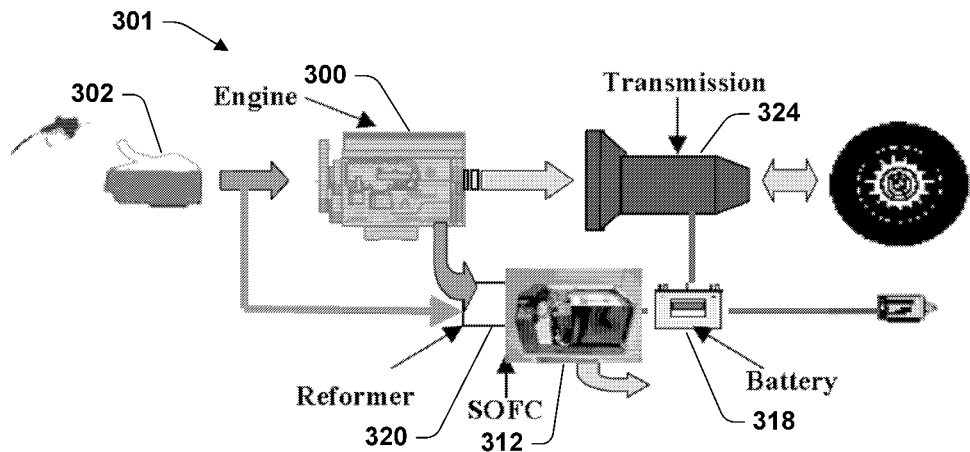
FIG. 9 an illustration showing the major components of an exemplary power generation system of the invention.
Figure 10:
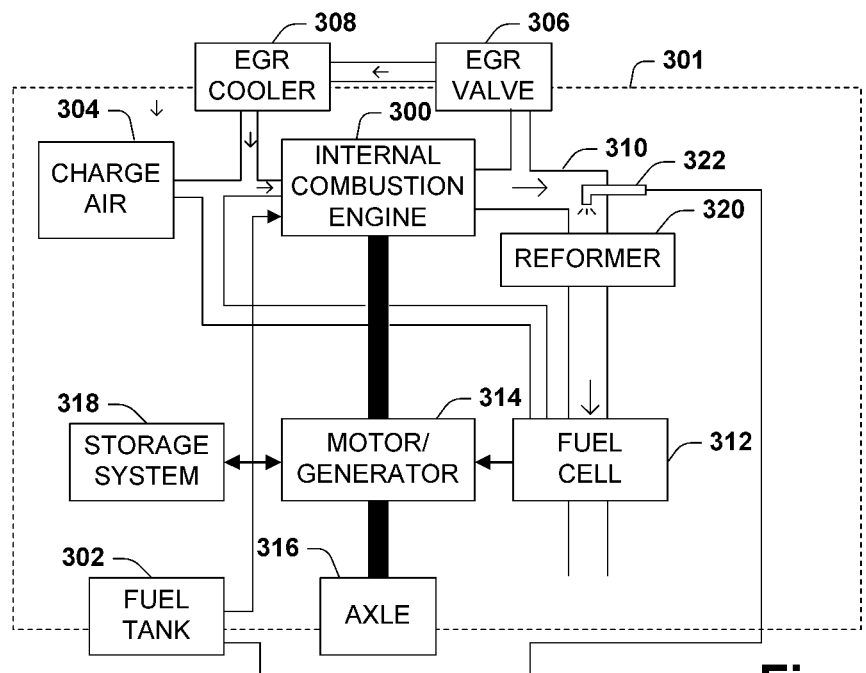
FIG. 10 is a schematic illustration of an exemplary power generation system of the invention.

A principal application for the engine 300 is in a power generation system 301 such as illustrated by FIGS. 9 and 10. The power generation system 301 comprises the engine 300 and a solid oxide fuel cell 312. The exhaust of the engine 300 is directed to the fuel side of the fuel cell 312. Optionally, a fuel reformer 320 is configured within the exhaust line 310 to process the exhaust as it travels from the engine 300 to the fuel cell 312.

The engine 300 with all its combustion chambers 200 operating according to the method 100 provides mechanical power to the axle 316 while also supplying a hot exhaust that is high in chemical energy. The chemical energy is utilized by the fuel cell 312 to produce electrical energy. The heat of the exhaust helps maintain the fuel cell 312 at an operational temperature. When the optional fuel reformer 320 is included, the heat of the exhaust maintains the temperature of the fuel reformer 320 and can support endothermic reforming reactions within that device.

The fuel reformer 320 may further reform partial combustion products from the engine 300. If the fuel reformer 320 is supplied with secondary air, the fuel reformer 320 can provide additional heat to drive reforming reactions and maintain the fuel cell 312 at an operating temperature. The main function of the fuel reformer 320, where provided, is to reform supplemental fuel that has not undergone reforming within the engine 300. Such supplemental fuel may have been injected into the engine 300 late in the power stroke or during the exhaust stroke, or may have been into the exhaust downstream from the engine using the fuel injector 322. Preferably, the engine exhaust provides enough heat to support reforming of any supplemental fuel. As a further note, fuel reforming may be carried out within the fuel cell 312 rather than in a separate fuel reformer 320.

The solid oxide fuel cell 312 provides substantial conversion of incomplete combustion products, including reformate, from the engine 300 and the fuel reformer 320. Because production of other major pollutants from the engine 300 is largely avoided by using the low temperature combustion mode, the fuel cell 312 can substantially clean the exhaust by effectively removing the incomplete combustion products. If necessary, a clean-up oxidation catalyst with a secondary air source can be provided to remove any incomplete combustion products left unconverted by the fuel cell 312.

The electricity produced by the fuel cell 312 can be used for any suitable purpose. Usually, the amount of electrical energy produced by the fuel cell 312 will be similar in magnitude or greater than the mechanical energy output of the engine 300. In a preferred embodiment, an electric motor 314 is provided whereby electrical energy can be converted to mechanical energy and used to drive the axle 316. It is also preferred that the power generation system 301 include an energy storage system 318 to store excess electrical energy. It is preferred that the electric motor 314 can be run in reverse to utilize mechanical energy to produce electrical power during periods over which all or part of the mechanical energy produced by the engine 300 is not require to drive the axle 316. The axle 316 and the electric motor/generator 314 can then be used for regenerative braking as well.

The fuel cell 312 oxidizes CO, $H_2$, and other organic compounds to water and $CO_2$ while producing substantial amounts of electrical power. A substantial amount of power is an amount comparable to the output of the engine 300. Preferably, the fuel cell 312 substantially reduces the concentrations of CO and unburned organic compounds in the exhaust. Preferably, the fuel cell 312 removes at least about 50% of the CO in the exhaust, more preferably at least about 80%, and still more preferably at least about 90%. The term fuel cell as used herein is inclusive of devices comprising multiple individual fuel cells connected in parallel or in series. The fuel cell 312 can have any suitable structure. Suitable structures include, for example, tubular and planar structures.

Solid oxide fuel cells are generally characterized in terms of their electrolytes. Any suitable electrolyte can be used. Examples of electrolytes include stabilized zirconium, such as $Y_2O_3$ stabilized $ZrO_2$; ceria-based oxides, chlorides, and fluorides, such as gadolinium doped $CeO_2$; alumina electrolytes, such as chloride, fluoride, or sodium doped alumina; lanthanum electrolytes, such as strontium doped lanthanum maganite and lanthanum gallate; and doped bismuth oxides, such as bismuth vanadium cobalt oxide.

The anodes and cathodes can be of any suitable type. Suitable electrodes have low thermal mismatch with the electrolyte material. The cathode is electrically conductive, reacts with oxygen to form oxygen ions, and allows ions to pass to or from the electrolyte. Depending on the electrolyte, a suitable cathode material could be a porous lanthanum strontium maganite, a lanthanum strontium ferrite or lanthanum strontium cobalt ferrite. The anode is also electrically conductive and allows the passage of ions. A suitable anode material could be nickel. The exemplary anode and cathode material are commonly mixed with the electrolyte material, as this generally gives better performance.

A preferred fuel cell is an intermediate temperature solid oxide fuel cell (ITSOFC). An intermediate temperature solid oxide fuel cell is a fuel cell operative within the range from about 250 to about 600° C., more preferably operable at a temperature within the range from 400 to 550° C. Being operative at a temperature means that the fuel cell can operate at that temperature with a substantial efficiency, in terms of energy production from at least CO, over a substantial period. Examples of ITSOFCs include proton-conducting perovskites such as $BaZrO_3$, $BaCeO_3$, and $SrCeO_3$. A typical operating range for this type of fuel cell is from about 400 to about 700° C.

One advantage of the ITSOFC is that it does not heat the exhaust to as great an extent as a higher operating temperature SOFC. In prior art vehicles with fuel cells, the waste heat from the SOFC exhaust could be in part recovered by the engine through EGR or heating the engine coolant. In the present invention, such heat recovery is generally not practical or effective. Accordingly, the selection of the ITSOFC leads to a significant improvement in fuel economy when the engine 300 is operated in a low temperature combustion mode.

Auto-ignition requires careful control of the factors affecting the ignition point. The requirements of the rich low temperature combustion mode of the present invention limit the torque-speed range over which the engine 300 can be operated. For these reasons, it is preferred that the engine 300 be restricted to operate within a narrow torque-speed range. The engine 300 can be maintained in a narrow torque-speed range in the face of varying power demand by one or more of altering the load on the axle 316 placed by the motor/generator 314 either augmenting the torque from the engine 300 or drawing off excess torque, altering the amount of supplemental fuel provided to the fuel reformer 320 and thus the electrical power output of the fuel cell 312, altering the rate of storage or draw from the energy storage system 318, and shutting down the engine 300 when there is surplus power and the energy storage system 318 is filled capacity.

Figure 11:
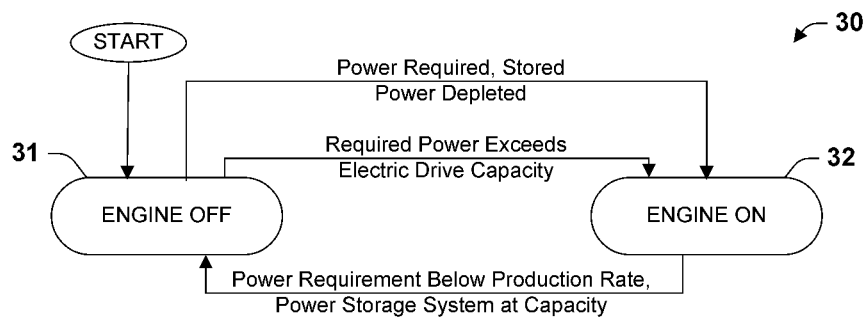
FIG. 11 is a finite state machine diagram of a method of the invention.

For example, the power generation system 301 can be controlled to power a vehicle while restricting the engine 300 to operate at either a specified torque-speed point or in an off state. FIG. 11 provides a finite state machine diagram 30 illustrating this control system. The operation begins with the engine in the off state 31. In the engine off state 31, neither the engine 300 nor the fuel cell 312 receives fuel or produces power. Power demands are met by drawing on the energy storage system 318. If torque is required to drive the vehicle, it is provided by the electric motor 314.

The power generation system 301 departs from the engine off state 31 if either of two conditions is met. One of those conditions is a power demand at a time when stored energy is depleted to or below a target level. An alternative to this condition is to simply check whether the stored energy is depleted without regard for whether there is a current power demand. The other condition that can cause a transition from the engine off state 31 to the engine on state 32 is a power demand that cannot be met by drawing on stored power alone. For example there is a maximum torque that can be generated by electric motor 314. If an operator requests a higher level of torque, it cannot be provided without starting the engine 300 so that the engine's torque may be added to the output from the electric motor 314. Likewise, there is a maximum current that can be drawn from the energy storage system 318. If a greater amount of electrical power is required, the engine 300 is started so that electrical power can be provided by the fuel cell 312 and by the electrical motor/generator 314 as well as the energy storage system 318.

In the engine on state 32 both the engine 300 and the fuel cell 312 are producing power. The engine 300 is operated in a narrow torque-speed range with a relatively constant fueling rate so that it provides an essentially constant amount of torque. Likewise the engine 300 produces a steady flow of reformed fuel for consumption by the fuel cell 312. In this example, there is no supplemental fuel injection into the exhaust line so that the fuel cell 312 also has only one rate at which it produces energy. The motor generator 314 can be used to vary the proportion between electrical and mechanical power, but the total power output of the power generation system is fixed in the operating state 32. If the total power demand exceeds the output of the engine 300 and the fuel cell 312, supplemental power may be provided by the energy storage system 318 for limited periods of time. If the total power demand is less than the output of the engine 300 and fuel cell 312, the surplus power is stored in the energy storage system 318. If surplus power is still being generated when the energy storage system 318 reaches its capacity, the power generation system 300 transitions to the engine off state 31.

In an alternative embodiment, the operating state 32 comprises providing supplemental fuel for the fuel cell 312, for example by injecting fuel into the exhaust line 310 or by injecting the additional fuel into the volume 210 during the power stroke or the exhaust stroke. The rate of the supplemental fuel injection can be fixed. In one embodiment there is no supplemental fuel injection. In another embodiment there is a fixed rate of fuel injection that is matched to the exhaust temperature, whereby there is just enough energy in the exhaust to reform the supplemental fuel while maintaining the fuel reformer 320 and the fuel cell 312 at operating temperature.

The fuel reformer 320 and the fuel cell 312 are typically operable over a range of supplemental fuel injection rates for a given exhaust flow rate and temperature. In an alternative embodiment, this range is utilized and the supplemental fuel injection rate is increased when power demands increase. This could be represented by a third state added to the finite state diagram 30 of FIG. 10. Whereas state 32 is a state with the engine on and a pre-determined fixed rate of supplemental fuel injection, which may be zero, the third stage is one with the engine on and a comparatively higher rate of fuel injection. The transition from state 32 to this third stage is made when power demands exceed the output provided by the engine 300 and the fuel cell 312 in the state 32. When power demands decrease, the system can transition back to state 32. The potential range of supplemental fueling rates can be increased if a secondary air source is provided to make oxygen available for combustion in the fuel reformer 320.

A further potential modification to the operating scheme of diagram 30 is based on the idea that several stable and reliable rich low-temperature combustion mode operating states ("sweet spots") may be identified for the engine 300. Each of these different operating states would be characterized by a particular combination of operating parameters: engine rpm, fuel-air ratio achieved by pre-injection, intake valve timing, and EGR rate, or a particular torque-speed point. Small variations in power demands are accommodated as described previously without perturbing the operation of the engine 300. Within each operating state, the engine 300 is controlled to maintain the engine in the targeted state as opposed to controlling the engine to meet a current torque, speed, or power demand. However, a large change in demand for either electrical or mechanical power can be met by step changes that abruptly transition the engine 300 from one to another rich low-temperature combustion mode operating state. Having a plurality of operating states to choose from simplifies meeting varying power demands.

In the foregoing examples, the fuel cell 312 is never operated unless the engine 300 is also on. In an alternative embodiment, the fuel cell 312 can be operated with the engine 300 off provided that the fuel reformer 320 is warmed up. The engine 300 can be operated as a pump to provide air to react with fuel. Another enabling option for this alternative embodiment is a secondary air source for the exhaust line 310. A secondary air source could be, for example, an air pump or a Venturi configured to provide air to the exhaust line 310.

Configuring the fuel reformer 320 to operate independently of the engine 300 is useful, but creates additional design demands and loses some of the advantages of the system in which the engine 300 is relied on to provide heat energy for the fuel reformer 320 and fuel cell 312. Both the fuel reformer 320 and the fuel cell 312 require heat. Generating this heat by operating the engine 300 in a rich low temperature combustion mode provides the opportunity to efficiently and cleanly generate mechanical power at the same time. What would otherwise be waste heat from the engine 300 becomes a required resource for the exhaust system devices. What would otherwise be pollutants (incomplete combustion products) becomes fuel. Thus, there is a synergy between operating engine 300 in the rich low-temperature combustion mode in conjunction with treating the exhaust by the fuel cell 312 and the optional fuel reformer 320.

Another synergy is that operating the engine 300 in a rich low-temperature combustion mode facilitates operating the exhaust line fuel reformer 320. Where the function of the exhaust line fuel reformer 320 is to remove excess oxygen from the exhaust while generating reformate (products of fuel reforming) for use by a downstream device, it proves difficult to maintain the temperature of the fuel reformer 320 while generating the desired amount of reformate. In the prior art, measures such as pulsing the fuel supply to the fuel reformer 320 were often necessary to prevent the fuel reformer 320 from overheating. Pulsing provides periods during which the fuel reformer 320 is allowed to cool. These cooling periods are also times in which the fuel reformer 320 is unable to perform its intended function. The present invention allows continuous operation of the exhaust line fuel reformer 320. The present invention can relieve the fuel reformer 320 from responsibility for removing excess oxygen from the exhaust. Providing a substantially oxygen free exhaust by operating engine 300 according to the present invention eliminates the possibility of combustion in the exhaust overheating exhaust line devices.

Figure 12:
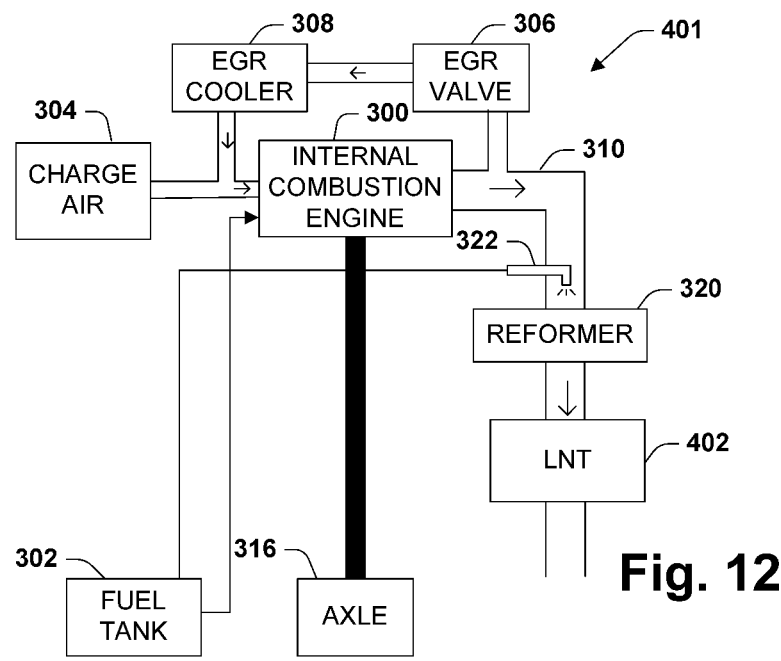
FIG. 12 is a schematic illustration of an exemplary power generation system according to a different aspect of the invention.

The synergy between operation of the engine 300 in a rich low-temperature combustion mode and operating the fuel reformer 320 within the engine exhaust stream is also useful in the power generation system 401 illustrated by FIG. 12. In the power generation system 401, the fuel reformer 320 does not serve a fuel cell 312. Instead, the fuel reformer 320 provides reformate for regenerating the lean $NO_X$ trap 402 (alternatively referred to as an LNT, a $NO_X$ absorber-catalyst, or a $NO_X$ trap-catalyst).

For the system 401, the engine 300 is normally operated in a conventional lean mode that produces $NO_X$. The lean $NO_X$ trap 402 traps the $NO_X$ during lean periods and must be regenerated periodically to remove the trapped $NO_X$. The lean $NO_X$ trap 402 also accumulates $SO_X$ and must be regenerated for longer but less frequent periods to remove accumulated $SO_X$.

These regenerations are particularly difficult when the engine 300 is idling or operating at low power. At low power and idle, the engine 300 produces an exhaust that has a low temperature and high oxygen concentration. A large amount of fuel must be provided to the exhaust just to eliminate the oxygen. Removing the oxygen produces a great deal of heat. Ideally this heat is taken up with endothermic steam reforming reactions. As a practical matter it is difficult to balance the rate of exothermic and endothermic reactions. Also, a high fueling rate may provide more reductant that can be effectively used. This is especially a problem for desulfation. Desulfating conditions must be maintained over an extended period of time and desulfation consumes reductant only slowly. Operating the fuel reformer 320 auto thermally (with exothermic combustion balancing endothermic steam reforming) would produce far more reductant than can be effectively utilized. Burning excess reductant creates another heat disposal problem.

In practice, when the exhaust oxygen concentration is high, regenerating the LNT 402 when the engine 300 is operating lean involves a large amount of exothermal reaction within the exhaust line 310. This heat is a constant threat to damage the fuel reformer 320 and/or the LNT 402. The solution of carrying out the desulfation in pulses while allowing the fuel reformer 320 and the LNT 402 to cool between pulses is less than ideal. Between pulses, the exhaust becomes lean and oxygen from the exhaust is stored in the LNT 402. This oxygen must be burned off during the subsequent rich phase. Temperature control is difficult and carrying out the desulfation in pulses extends the time required for the desulfation and the fuel expenditure required for desulfation.

In the system 401, the engine 300 is switched to operate in the rich low temperature combustion mode when regeneration of the LNT 402 is required. This may be done for all regenerations, or selectively for only certain regeneration. For example, the rich low temperature combustion mode may be used for regenerations that are required at times the engine 300 is in a low power or idle state. Alternatively or in addition, the rich low temperature combustion mode may be used only for desulfations. In the rich low temperature combustion mode the engine 300 produces reformate and potentially eliminates the need for the fuel reformer 320 when low temperature combustion mode operation is possible.

Even when the rich low temperature mode is not the primary means of generating reformate, it is a useful compliment to the fuel reformer 320. The rich low temperature combustion mode can be used when the fuel reformer 320 is below its light-off temperature, which is the temperature from which the fuel reformer 320 is effective to catalyze combustion and is therefore able to be heated by injecting fuel into the exhaust upstream from the fuel reformer 320. In this example, the rich low temperature combustion mode heats the fuel reformer to at least the light-off temperature.

The preferred fuel reformer 320 operates on diesel fuel through both oxidation and steam reforming reactions. Steam reforming requires at least about 500° C., which is generally above the exhaust temperatures. Accordingly, the fuel reformer 320 must generally be heated to at least about 500° C. under lean condition before it can be used to produce reformate for regenerating the LNT 402. The rich low temperature combustion mode can be used to heat a reformer all the way to steam reforming temperatures.

A fuel reformer is a device that converts heavier fuels into lighter compounds without fully combusting the fuel. Suitable oxidation catalysts for the fuel reformer 320 include precious metals, such as Pt and Pd on high surface area oxide supports, preferably aluminum doped with La. A preferred reforming catalyst is Rh, most preferably on a support of $ZrO_2$ doped with La. A reformer is preferably small in size as compared to an oxidation catalyst or a three-way catalyst designed to perform its primary functions at temperatures below 450° C. The fuel reformer 320 is generally operative at temperatures from about 500 to about 800° C. A preferred monolith support is a metal foil monolith. A typical reformer lights off at a temperature of about 250° C., although the invention enables reformers with higher light-off temperatures, e.g., 300° C. or higher.

An LNT is a device that absorbs $NO_X$ under lean conditions and reduces and releases absorbed $NO_X$ under rich conditions. An LNT generally comprises a $NO_X$ absorbent and a precious metal catalyst in intimate contact on an inert support. Examples of $NO_X$ absorbent materials include certain oxides, carbonates, and hydroxides of alkaline earth metals such as Mg, Ca, Sr, and Ba or alkali metals such as K or Cs. These materials reversibly react with $NO_X$ to form compounds in which the $NO_X$ is trapped. The precious metal typically comprises one or more of Pt, Pd, and Rh. The support is typically a monolith, although other support structures can be used. The monolith support is typically ceramic, although other materials such as metal and SiC are also suitable for LNT supports. The LNT 402 may be provided as two or more separate bricks.

From time-to-time, the LNT 402 is regenerated to remove accumulated $NO_X$ (denitrated) in a rich phase. Denitration generally involves heating the fuel reformer 320 to an operational temperature and then using the fuel reformer 320 to produce reformate. The reformate reduces $NO_X$ absorbed in the LNT 402.

A controller schedules denitration of the LNT 402 based on criteria relating to the state and or performance of the exhaust aftertreatment system or a portion thereof comprising the LNT 402. Criteria for scheduling LNT denitration may be based on LNT loading. LNT loading can be characterized in terms of amount of $NO_X$ accumulated, remaining $NO_X$ storage capacity, percent saturation, or another parameter of this type. Numerous methods for estimating $NO_X$ loading and/or remaining $NO_X$ storage capacity have been proposed. These methods generally involve integrating an estimate of the $NO_X$ storage rate and comparing the result to an estimated $NO_X$ storage capacity.

From time to time, the LNT 402 must also be regenerated to remove accumulated sulfur compounds (desulfated). Desulfation involves heating the fuel reformer 320 to an operational temperature, heating the LNT 402 to a desulfating temperature, and providing the heated LNT 402 with a rich atmosphere. Desulfating temperatures vary, but are typically in the range from about 500 to about 800° C., with optimal temperatures typically in the range from about 650 to about 750° C. Below a minimum temperature, desulfation is excessively slow. Above a maximum temperature, the LNT 402 may be damaged.

The preferred systems of the invention are constructed without valves or dampers to control the flow of exhaust to the fuel reformer 320. Exhaust line valves have a high failure rate and make meeting the durability and reliability requirements for exhaust aftertreatment systems difficult to meet. The rich low temperature combustion mode facilitates the operation of a fuel reformer that receives the engine exhaust at a rate that is uncontrolled or controlled without regard for the requirements of the fuel reformer 320.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art.

The invention claimed is:

1. An engine having a combustion chamber, comprising:
   a combustion chamber that operates to alternately expand and contract a volume enclosed by the combustion chamber;
   an intake valve for the combustion chamber controlled to provide an air charge to the combustion chamber volume as that volume is expanding; and
   a fuel injector controlled to provide a pre-injection of fuel into the combustion chamber volume to mix with the air charge, the pre-injection amount providing the mixture a rich fuel-air ratio, the pre-injection timing being controlled to generate the rich mixture within the combustion chamber before the mixture begins to combust;
   the controlled air charge and the pre-injection amounts being such that the rich fuel-air mixture will auto-ignite within the combustion chamber as a result of compression caused by contracting the volume, the amounts also being regulated such that the mixture will combust at temperatures that remain below a temperature at which significant amounts of soot would be produced, the combustion chamber thereby being functional to produce an exhaust that is rich and substantially free of $NO_X$ and soot.

2. The engine of claim 1, wherein the intake valve is controlled to limit the air charge by closing the valve before the has volume has fully expanded, the valve being controlled to close with a timing that results in a sub-atmospheric pressure, which is 0.9 atmospheres or less within the volume at the time of full expansion.

3. The engine of claim 1, further comprising an exhaust valve for the combustion chamber controlled to open before the completion of the combustion chamber volume expansion at a timing sufficiently early to result in an exhaust temperature higher than if the expansion were allowed to complete prior to opening the exhaust valve.

4. A power generation system comprising:
   the engine of claim 1; and
   a solid oxide fuel cell having an air side and a fuel side and configured to receive the engine exhaust on its fuel side and being functional to substantially reduce the chemical energy content of the exhaust while using the chemical energy to produce electrical power.

5. The power generation system of claim 4, wherein the fuel cell is an intermediate temperature solid oxide fuel cell and the combustion chamber functions to produce the rich exhaust at a temperature at which the fuel cell is operative.

6. The power generation system of claim 4, further comprising:
   a fuel reformer configured to treat the exhaust between the combustion chamber and the solid oxide fuel cell; and
   the combustion chamber functions to produce the rich exhaust at a temperature greater than 250° C. that is above the light-off temperature for the fuel reformer.

7. A power generation system comprising:
   the engine of claim 1;
   a lean $NO_X$ trap configured to treat the exhaust from the engine, the lean $NO_X$ trap being a device that absorbs and stores $NO_X$ under lean conditions and reduces and releases the absorbed $NO_X$ under rich conditions;
   a controller programmed to switch the engine from the rich low-temperature combustion mode into a lean combustion mode upon completing desulfation of the lean $NO_X$ trap.

8. A method of operating a combustion chamber in a low temperature combustion mode, comprising:
   operating the combustion chamber in a cycle comprising an intake stroke, a compression stroke, a power stroke, and an exhaust stroke;
   providing the combustion chamber with an air charge during the intake stroke;
   providing the combustion chamber with a fuel charge to mix with the air charge to give a fuel-air equivalence ratio of at least 1.05, the fuel and air charges being made present within the combustion chamber at the time the cycle reaches twenty crank angle degrees before top dead center during the compression stroke;

providing the fuel and air charges in amounts and under conditions such that the mixture auto-ignites as a result of the heat and pressure generated by the compression stroke;

the fuel and air charge amounts and other conditions of combustion being further qualified to limit the temperature of the resulting combustion to sufficiently low that the combustion does not produce soot in significant amounts.

9. The method of claim 8, wherein the air charge amount is restricted by closing an intake valve before the intake stroke is complete, the closing being sufficiently early to result in a sub-atmospheric pressure within the combustion chamber at the end of the intake stroke.

10. The method of claim 9, where in the engine is a compression ignition diesel engine having a variable valve mechanism and the fuel is a diesel fuel.

11. The method of claim 10, wherein the engine is designed for operation in a convention diesel cycle with direct fuel injection and stratified combustion.

12. The method of claim 8, wherein:

the combustion chamber operation produces an exhaust having a temperature greater than 250° C.; and the combustion chamber is operated without exhaust gas recirculation or an exhaust gas recirculation rate of 25% or less.

13. A method of operating a power generation system comprising a direct injection diesel engine and an exhaust aftertreatment system, comprising:

operating the engine in a conventional diesel cycle;

regenerating a device in the exhaust aftertreatment system by switching the operating mode of one or more of the engine's combustion chambers to a rich low temperature combustion mode according to the method of claim 8.

14. A method of operating a power generation system comprising a direct injection diesel internal combustion engine and an exhaust aftertreatment system comprising an exhaust line fuel reformer, comprising:

operating the engine in a conventional diesel cycle;

heating the reformer by operating the engine in a rich low temperature combustion mode according to the method of claim 8.

15. A method of operating a power generation system comprising an internal combustion engine and a solid oxide fuel cell having an air side and a fuel side, comprising:

operating the engine's combustion chambers by the method of claim 8; and supplying the engine exhaust to the fuel side of the solid oxide fuel.

16. The method of claim 15, further comprising adding addition fuel to the exhaust and reforming the fuel in the exhaust using a fuel reformer prior to passing the exhaust and reformed fuel to the fuel side of the fuel cell.

17. The method of claim 16, wherein the energy required to reform fuel in the fuel reformer is derived entirely from the heat of the engine exhaust.

18. The method of claim 15, further comprising regulating the temperature of the exhaust by varying the timing with which exhaust valves are opened.

19. The method of claim 15, further comprising stabilizing the operation of the engine by responding to a fluctuating demand for mechanical power by drawing variable mechanical power from an electric motor while keeping the engines mechanical power output relatively steady.

20. The method of claim 19, wherein stabilizing the engine operation further comprises running the electric motor in reverse to generate electricity from mechanical power produced by the engine when the engine is producing mechanical power in excess of the demand.

* * * * *